United States Patent
Wisniewski et al.

(10) Patent No.: US 10,490,163 B1
(45) Date of Patent: Nov. 26, 2019

(54) EXTERIOR HUMAN MACHINE INTERFACE DISPLAY ADJUSTMENT BASED ON CUSTOMER LOCATION

(71) Applicant: GM Global Technology Operations LLC, Detroit, MI (US)

(72) Inventors: Chris Wisniewski, Oshawa (CA); Jarvis Chau, Markham (CA); Shaun S. Marshall, Port Perry (CA)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 16/054,192

(22) Filed: Aug. 3, 2018

(51) Int. Cl.
*G09G 5/10* (2006.01)
*G01S 19/46* (2010.01)
*G01S 19/51* (2010.01)
*H04W 4/02* (2018.01)
*H04W 4/40* (2018.01)

(52) U.S. Cl.
CPC .............. *G09G 5/10* (2013.01); *G01S 19/46* (2013.01); *G01S 19/51* (2013.01); *G09G 2320/0626* (2013.01); *G09G 2354/00* (2013.01); *G09G 2380/10* (2013.01); *H04W 4/023* (2013.01); *H04W 4/40* (2018.02)

(58) Field of Classification Search
CPC ............. G09G 5/10; G09G 2320/0626; G09G 2380/10; G01S 19/46; G01S 19/51; G01S 19/41; G01S 19/31; G01S 19/32; H04W 4/023
See application file for complete search history.

(56) References Cited

U.S. PATENT DOCUMENTS

| | | | |
|---|---|---|---|
| 9,734,744 B1 * | 8/2017 | McGie | G09G 3/14 |
| 9,841,939 B2 * | 12/2017 | Liu | G06F 3/1454 |
| 10,255,791 B2 * | 4/2019 | Wilkinson | H04W 4/029 |
| 2018/0040296 A1 * | 2/2018 | Zhan | G06F 3/0416 |

* cited by examiner

*Primary Examiner* — Antonio A Caschera

(57) ABSTRACT

A method for automatically adjusting a human machine interface (HMI) display includes: collecting customer location data from a personal communication device and from sensor signals from a sensor mounted on an automobile vehicle as a customer approaches the vehicle; determining if the customer is within one of a first distance range of the vehicle, a second distance range closer to the vehicle than the first distance range, or a third distance range closer than the second distance range; and setting an illumination level of an HMI display of the vehicle based on the distance range, wherein the illumination level is set to: a high brightness if the customer is within the first distance range, a medium brightness less than the high brightness if the customer is within the second distance range; or a low brightness less than the medium brightness if the customer is within the third distance range.

18 Claims, 3 Drawing Sheets

EXTERIOR HUMAN MACHINE INTERFACE DISPLAY ADJUSTMENT BASED ON CUSTOMER LOCATION

INTRODUCTION

The present disclosure relates to exterior display systems for automobile vehicles.

Exterior displays for automobile vehicles, including autonomous micro-transit and ride-hailing vehicles and buses, need sufficient brightness to be seen from a far distance, which may be approximately two blocks or greater than about 20 meters. As a customer approaches the vehicle, however, the high brightness level necessary for visibility out to the far distance is unappealing to the customer. Systems to automatically regulate the brightness are not currently known.

Thus, there is a need for a new and improved system and method for determining a customer location and to optimize exterior displays for automobile vehicles based on the customer location.

SUMMARY

According to several aspects, a method for automatically adjusting a human machine interface (HMI) display of an automobile vehicle includes: collecting customer location data of a customer; determining a distance between the customer and an automobile vehicle using the location data; and changing an illumination level of an HMI display provided with the vehicle based on the distance between the customer and the vehicle.

In another aspect of the present disclosure, the method further includes dividing the distance into multiple distance ranges.

In another aspect of the present disclosure, the multiple distance ranges include: a first distance range including any distance greater than a predefined long-range distance threshold; a second distance range including any distance less than the predefined long-range distance threshold but greater than a predefined short-range distance threshold; and a third distance range including any distance less than the predefined short-range distance threshold.

In another aspect of the present disclosure, the method further includes setting the long-range distance threshold in a range between 15 and 50 meters; and setting the short-range distance threshold in a range between 1 and 15 meters.

In another aspect of the present disclosure, the method further includes automatically illuminating the HMI display of the vehicle when the customer initiates an application on a customer personal communication device that communicates with the vehicle and the vehicle approaches the customer within the first distance range, or the customer approaches the vehicle within the first distance range or when the vehicle arrives at a specified customer pickup location.

In another aspect of the present disclosure, the method further includes setting the illumination level to a high brightness when the customer is at the first distance range at or beyond the predefined long-range distance threshold.

In another aspect of the present disclosure, the method further includes setting the illumination level to a medium brightness less than the high brightness when the customer is at the second distance range less than the predefined long-range distance threshold but more than the short-range distance threshold.

In another aspect of the present disclosure, the method further includes setting the illumination level to a lowest brightness when the customer is at the third distance range less than the short-range distance threshold.

In another aspect of the present disclosure, the method further includes determining a customer location using global positioning system (GPS) location data from a personal communication device, wherein at the first distance range low energy signals from the personal communication device lack signal strength to assist in determining an exact location of the customer.

In another aspect of the present disclosure, the method further includes determining a customer location when the customer is within the second distance range using global positioning system (GPS) location data from a personal communication device and low energy signals from the personal communication device to generate a customer location prediction.

In another aspect of the present disclosure, the method further includes determining a customer location when the customer is within the third distance range using global positioning system (GPS) location data from a personal communication device, low energy signals from the personal communication device and signals received from at least one sensor mounted on the vehicle providing an exact location of the customer.

According to several aspects, a method for automatically adjusting a human machine interface (HMI) display of an automobile vehicle, includes: collecting customer location data from a personal communication device of a customer and from sensor signals from at least one sensor mounted on an automobile vehicle as the customer approaches the vehicle; applying the customer location data to determine if the customer is within one of a first distance range of the vehicle, a second distance range closer to the vehicle than the first distance range, or a third distance range closer than the second distance range; and setting an illumination level of an HMI display provided with the vehicle based on the distance range between the customer and the vehicle, wherein the illumination level is set to: a high brightness if the customer is within the first distance range, a medium brightness less than the high brightness if the customer is within the second distance range; or a low brightness less than the medium brightness if the customer is within the third distance range.

In another aspect of the present disclosure, the method further includes presenting on the HMI display different image sizes, different image resolutions, different colors and different images based on the distance range to optimize image visibility, aesthetics and legibility.

In another aspect of the present disclosure, the method further includes displaying messaging on the HMI display only to a side of the vehicle where the customer is approaching toward.

In another aspect of the present disclosure, the method further includes displaying messaging on the HMI display directing the customer to: provide a warning; or direct the customer toward or away from one of multiple doors of the vehicle where the customer is approaching toward.

In another aspect of the present disclosure, the method further includes: providing the customer location data as GPS location data and low energy data collected from the personal communication device; adjusting the HMI display to present a data display on at least one of a vehicle right side, a vehicle left side, a vehicle front side and a vehicle rear side; and adjusting a size, a color, or a text of an image presented on the HMI display.

In another aspect of the present disclosure, the at least one sensor defines a range detecting sensor including one of an ultrasonic sensor, a radar sensor and a Lidar sensor identifying a side of the vehicle the customer is approaching toward.

According to several aspects, a method for automatically adjusting a human machine interface (HMI) display of an automobile vehicle includes: in a data acquisition step: collecting GPS data from a personal communication device; collecting low energy signals from the personal communication device; and collecting sensor output signal data from vehicle sensors to generate a predicted customer location; and in a decision step: at a first collection point if GPS location data is determined to be available but the low energy signals are weak and sensor output signal data is not available, a customer location cannot be confirmed, and the customer is determined to be at a distance from the vehicle greater than a long-range distance threshold; at a second collection point if the GPS location data is determined to be available and the low energy signals are available, but the sensor output signal data is not available the customer location is estimated, and the customer is determined to be at a distance from the vehicle less than the long-range distance threshold but more than a short-range distance threshold; at a third collection point if the GPS location data is determined to be available, the low energy signals are available, and the sensor output signal data is available the customer location is confirmed, and the customer is determined to be at a distance from the vehicle less than the short-range distance threshold.

In another aspect of the present disclosure, when the customer is determined to be at the distance from the vehicle greater than the long-range threshold a lighting system of an HMI display having each of a high illumination, a medium illumination less than the high illumination and a low illumination less than the medium illumination is set to the high illumination defining a high brightness with image parameters set for an optimal long-range visibility.

In another aspect of the present disclosure, when the customer is determined to be at the distance from the vehicle less than the long-range threshold but more than a short-range distance threshold a lighting system of an HMI display having each of a high illumination, a medium illumination less than the high illumination and a low illumination less than the medium illumination is set to the medium illumination defining a medium brightness with image parameters set for an optimal medium range visibility.

In another aspect of the present disclosure, when the customer is determined to be at the distance from the vehicle less than the short-range threshold a lighting system of an HMI display having each of a high illumination, a medium illumination less than the high illumination and a low illumination less than the medium illumination is set to the low illumination defining a low brightness with image parameters set for a short-range visibility.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
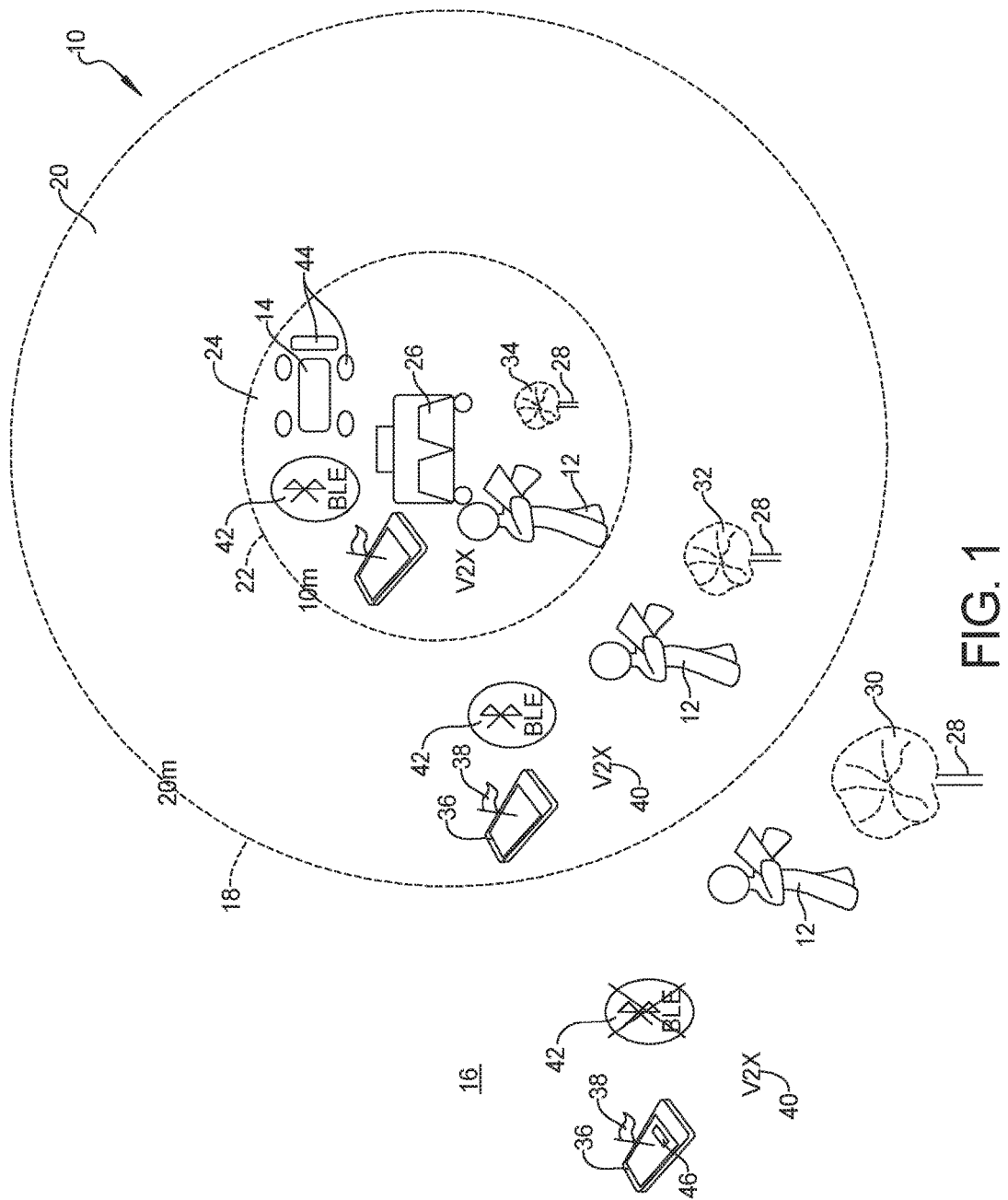
FIG. 1 is a diagrammatic presentation of a human machine interface (HMI) display adjustment system according to an exemplary embodiment.

Referring to FIG. 1, a human machine interface (HMI) display adjustment system 10 of the present disclosure initially identifies and tracks a distance between a customer 12 and a vehicle 14 as the customer 12 approaches the vehicle 14. According to several aspects, a semi-continuous or a continuous adjustment of a display is conducted as the customer 12 approaches the vehicle 14 and therefore as the distance continuously changes. According to further aspects, the distance is divisible into three distance ranges, although less than three or more than three distance ranges can be provided within the scope of the present disclosure. A first distance range 16 is any distance greater than a predefined long-range distance threshold 18, which can be for example a distance of 10 meters or greater from the vehicle 14. A closer second distance range 20 is less than the predefined long-range distance threshold 18 but greater than a predefined short-range distance threshold 22. The predefined short-range distance threshold 22 can be for example a distance less than 10 meters from the vehicle. A third distance range 24 is defined as any distance less than the predefined short-range distance threshold 22. These distance ranges and thresholds can also be varied from those identified as desired by the automobile manufacturer or customer, within the scope of the present disclosure.

As an additional, non-limiting example the long-range distance threshold 18 can vary between approximately 15 meters up to approximately 50 meters inclusive. The short-range distance threshold 22 can vary between approximately 1 meter up to approximately 15 meters inclusive. An HMI display 26 is mounted on, connected to, or otherwise provided with the vehicle 14 and is automatically illuminated after the customer 12 initiates an application on a customer personal communication device such as a smart phone or tablet that communicates with the vehicle 14, for example to order a short-term use of the vehicle 14, and the vehicle approaches the customer within a predefined distance range, or the customer approaches the vehicle 14 within the predefined distance range.

The HMI display 26 presents multiple different information displays to the customer 12. These can include but are not limited to: a customer name or a customer identification code used by the customer 12 to confirm the correct vehicle is being approached; information about the vehicle reservation; general lighting to assist the customer 12 when approaching the vehicle 14; assistance in identifying which side of the vehicle to enter such as text, arrows, or other insignia; security information concerning safety for the customer; advertisements or reservation information related to the customer; and the like.

For the viewing comfort of the customer 12, the HMI display 26 of the vehicle 14 is automatically adjusted to brighten or dim the illumination of a lighting system 28 associated with the HMI display 26 based on the determined distance between the customer 12 and the vehicle 14 and a location of the customer 12. For example, the lighting system 28 is energized to a high brightness 30 when the customer is at the first distance range 16 at or beyond the predefined long-range distance threshold 18. The lighting system 28 is energized to a medium brightness 32 less than the high brightness 30 when the customer is within the second distance range 20 from the vehicle 14 less than the predefined long-range distance threshold 18 but greater than the predefined short-range distance threshold 22. The lighting system 28 is energized to a low brightness 34 less than the medium brightness 32 when the customer is in the third distance range 24 at any distance from the vehicle 14 less than the predefined short-range distance threshold 22. The high brightness 30, the medium brightness 32, and the low brightness 34 can each be modified based on an ambient light condition. For example, each brightness level can be further enhanced or reduced in low ambient light levels, such as at night or at twilight times, and each brightness level can be enhanced or reduced in high ambient light levels, such as during bright daylight conditions.

For the first distance range 16 at or beyond the predefined long-range distance threshold 18 a customer location is determined using for example a personal communication device 36 providing for example global positioning system (GPS) location data 38 of the personal communication device 36 and therefore for the customer 12, communicated via cloud data or using V2X data 40. The personal communication device 36 may be held by the customer 12 or may be in close proximity to the customer 12, such as in a purse, luggage member, or the like. Customer location can also be obtained from on-board sensors provided by the vehicle 14. At the first distance range 16 low energy signals 42 defining for example Bluetooth® Low Energy (BLE) signals from the personal communication device 36, radio-frequency (RF) signals, an angle of arrival, or wireless-fidelity (WiFi) signals are expected to be unavailable or lacking in sufficient signal strength to assist in determining an exact location of the customer 12. When the customer 12 is at the first distance range 16 an accuracy of a customer location prediction generated by the HMI display adjustment system 10 is therefore considered to be low, having some distance data and some direction information. The lighting system 28 is therefore energized to the high brightness 30 when a predicted location of the customer 12 is determined to be at or beyond the first distance range 16 to maximize the capability of the customer 12 to view data being presented by the HMI display 26 of the vehicle 14.

When the customer 12 is within the second distance range 20 the customer location is determined using the personal communication device 36 providing for example the global positioning system (GPS) location data 38, communicated via cloud data or using the V2X data 40 in addition to the following. Within the second distance range 20 the low energy signals 42 from the personal communication device 36 are expected to be available to also assist in determining a more accurate location of the customer 12. When the customer 12 is within the second distance range 20 an accuracy of the customer location prediction generated by the HMI display adjustment system 10 is therefore considered to be medium, having distance data and some direction information. The lighting system 28 is therefore energized to the medium brightness 32 when a predicted location of the customer 12 is determined to be within the second distance range 20 to reduce the intensity of the projected image data while maintaining the capability of the customer 12 to view data being presented by the HMI display 26 of the vehicle 14 within any distance of the second distance range 20.

When the customer 12 is within the third distance range 24 a customer location is determined using the personal communication device 36 providing the global positioning system (GPS) location data 38, communicated via cloud data or using the V2X data 40 in addition to the following. Within the third distance range 24 the low energy signals 42 from the personal communication device 36 are available and at their highest energy level. In addition, the customer 12 is within a sensing range of one or more vehicle object locating sensors 44 such as ultrasonic, radar, or light detection and ranging (LIDAR) sensors mounted on the vehicle 14 which generate signals to assist in determining the most accurate location of the customer 12. When the customer 12 is within the third distance range 24 an accuracy of the customer location prediction is therefore considered to be high, providing precise location information. The lighting system 28 is therefore energized to the low brightness 34 to minimize the intensity of the projected image data while maintaining the capability of the customer 12 to view data being presented by the HMI display 26 of the vehicle 14 within any distance of the third distance range 24.

In each of the first distance range 16 and the second distance range 20 an identification symbol 46 in conjunction with the application provided on the personal communication device 36 is generated and presented on the personal communication device 36 as a message to confirm the customer 12 is within one of these distance ranges. When the customer enters the third distance range 24, in addition to the identification symbol 46 presented on the personal communication device 36 the HMI display adjustment system 10 can generate and present on the HMI display 26 the following: directions to a specific vehicle door, for example using arrows or text; hazard warnings, for example "not safe to enter"; different messages on different displays; display information presented only on a relevant display for reduced power consumption; and generating extra lighting if required, for example during daylight hours when additional lighting renders the presented information easier to view and read, or turning on all lights of the HMI display 26.

When a customer position is known, display brightness, size, colors, resolution, and the like are automatically adjusted as the customer 12 approaches the vehicle 14 to a predetermined optimum visibility. As noted above, messaging can also be adjusted, which for example can direct the customer 12 to a specific door, warn about hazards, and the like.

According to several aspects, an algorithm uses existing information such as the GPS location data 38 obtained from the customer's mobile personal communication device 36, low energy signals 42, and signals from the vehicle object locating sensors 44 to obtain and refine the most precise location of the customer 12 as the customer 12 approaches the vehicle 14. The refined location information is used together with artificial intelligence to optimize a display brightness and messaging.

An HMI display adjustment system 10 of the present disclosure enables: 1) directional or targeted messaging; 2) use of different image sizes, different image resolutions, different image colors or different images based on the distance between the customer and the vehicle to optimize visibility, aesthetics and legibility; 3) messaging is catered to the customer location, for example to give directions to the customer such as: "enter from other door" or "enter here"; 4) improved safety by providing warnings such as "not safe to enter", or changing certain displays, for example to turn on all LEDs (white or bright) to provide additional lighting; 5) when an exact location of the customer 12 is known within the third distance range 24, improved privacy is provided by displaying messaging only to a side of the vehicle where the customer is approaching toward, such as toward a right side door or a left side door, and therefore where messaging is necessary; and 6) reduced system power consumption by reducing lighting intensity when possible.

The HMI display adjustment system 10 of the present disclosure also provides knowledge about a customer proximity which allows vehicle image displays to be dimmed when a high brightness is not needed. Knowledge about exact customer position also allows some displays to be turned off when deemed unnecessary. For example displays can be turned off when the customer has walked a predetermined distance away from the vehicle, different side displays such as left or right side displays can be turned off for example if the user is in front of or behind the vehicle and therefore not in a position to see such side displays, and displays can be presented that are intended for non-users of the vehicle such as "vehicle waiting" or "in-use".

The HMI display adjustment system 10 of the present disclosure uses information from multiple sources with an algorithm and/or artificial intelligence to produce an increasingly accurate prediction of a customer distance and a customer location as the customer 12 approaches the vehicle 14. This information is then used to enhance the customer experience and safety by optimizing the lighting and messaging from the HMI display 26 based on a customer distance from the vehicle 14 and an estimated customer location around the vehicle 14.

Referring to FIG. 2 and again to FIG. 1, a flowchart 48 presents steps for using the HMI display adjustment system 10 of the present disclosure. These include in a data acquisition step 50: collecting GPS data from the personal communication device 36 via cloud data or using the V2X data 40; collecting low energy signals 42; collecting sensor output signal data from the vehicle object locating sensors 44 to generate a predicted customer location. Data collected in the data acquisition step 50 is forwarded to a signal processor 52 wherein current available data is evaluated and a previous customer location prediction is compared to the current available customer distance and location data.

Following signal processing in the signal processor 52, decisions confirming a customer distance from the vehicle 14 are made. For example at a first collection point 54 GPS location data 38 is determined to be available, however the low energy signals 42 are either not available or are weak and sensor data is not available. A customer location therefore cannot be confirmed. Based on the above, in a first decision block 56 the customer 12 is determined to be at a distance from the vehicle 14 greater than the long-range distance threshold 18, with an exact location unknown. Based on the first decision block 56 in a first action block 58 the following actions are taken. A coarse prediction of the customer location and customer distance from the vehicle 14 are made based on the above available data. The lighting system 28 of the HMI display 26 is set to its maximum defining the high brightness 30 with image parameters set for optimal long-range visibility.

At a second collection point 60 GPS location data 38 is determined to be available, the low energy signals 42 are determined to be available, however, signals from the vehicle object locating sensors 44 are not available to confirm a customer location. A customer location therefore cannot be confirmed. Based on the above, in a second decision block 62 the customer is determined to be at a distance from the vehicle 14 less than the long-range distance threshold 18, but an exact customer location cannot be confirmed. Based on the second decision block 62 in a second action block 64 the following actions are taken. A refined prediction of the customer location and customer distance from the vehicle 14 are made based on the above available data. The lighting system 28 of the HMI display 26 is set to its intermediate level defining the medium brightness 32 with image parameters set for optimal medium range visibility.

At a third collection point 66 GPS location data 38 is determined to be available, the low energy signals 42 are determined to be available, and signals from the vehicle object locating sensors 44 are available to confirm a customer location with good correlation to the predictions from other data. Based on the above, in a third decision block 68 the customer is determined to be at a distance from the vehicle 14 less than the short-range distance threshold 22, and an exact customer location is known and is confirmed. Based on the third decision block 68 in a third action block 70 the following actions are taken. The customer position is tracked using the vehicle object locating sensors 44. The lighting system 28 of the HMI display 26 is set to its lowest level defining the low brightness 34 with image parameters set for optimal short-range visibility. Directional messaging is implemented wherein different images are presented on different displays of the HMI display 26.

After any of the actions taken by the first action block 58, the second action block 64 or the third action block 70 are taken, a rescan step 72 is conducted. The HMI display adjustment system 10 then returns to the data acquisition step 50 and the program steps are repeated.

Figure 2:
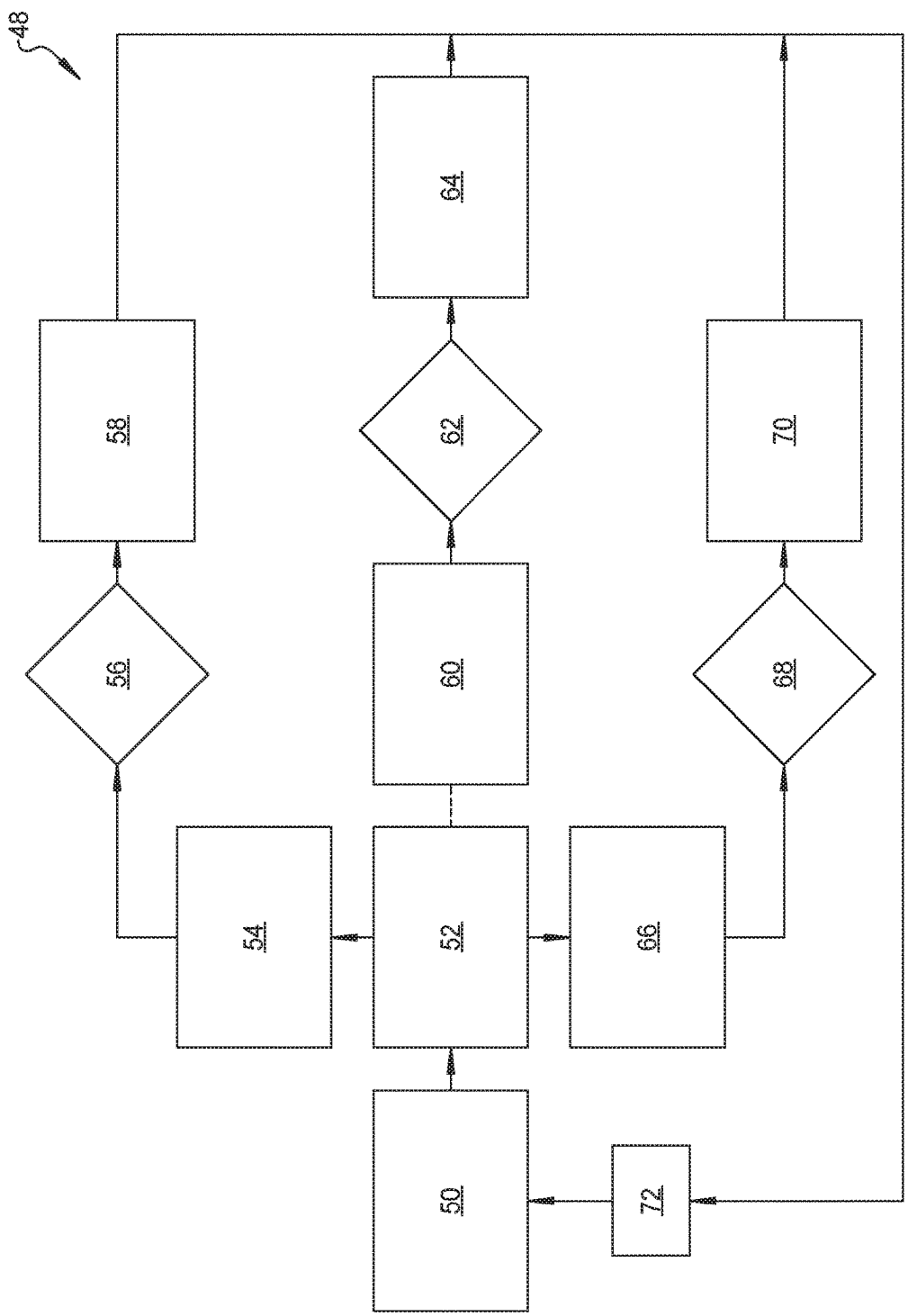
FIG. 2 is a flow diagram presenting the method steps taken by the HMI display adjustment system of FIG. 1.

Referring to FIG. 3 and again to FIGS. 1 and 2, the HMI display adjustment system 10 includes a control module 74 containing logic to process inputs from each of the vehicle object locating sensors 44, and is in communication with the HMI display 26. The vehicle 14 may also be equipped with a radar or Lidar imaging system 76, which, when present, is also in communication with the control module 74. It should be appreciated by those having ordinary skill in the art that the vehicle 14 could utilize a number of methods to identify distances and locations in addition to or in the alternative to the use of the vehicle object locating sensors 44, including use of a camera with the imaging system 76. The control module receives information including the GPS location data 38 remotely from the personal communication device 36, the data from the vehicle object locating sensors 44, and other similar system data. The HMI display 26 can be positioned at any location on the vehicle 14, including on a hood 78, on a roof 80, or on a door 82, on or within glazing of a windshield, side window or rear window and alternatively can divided into multiple individual display elements positioned on multiple ones of the vehicle surfaces. The disclosure herein can be applied to various device arrangements and is therefore not limited thereby.

The imaging system 76 is well known in the art incorporating a transmitter capable of emitting radio waves or other electromotive (EM) radiation, a receiver device capable of sensing the emitted waves reflected back to the receiver from objects in front of the transmitter, and means to transfer the sensed waves into a data format capable of analysis, indicating for example range and angle from the objects off which the waves reflected. The imaging system 76 may include or be replaced or supplemented with a light detection and ranging (LIDAR) system configured to transmit and receive optical energy. The received optical energy may be used to determine customer geometric dimensions and/or geometrical proximity to the vehicle 14. It will be noted that imaging system 76 can process visual images and is capable of accomplishing clear path detection. The term "clear path" as used herein is to be given its ordinary and customary meaning to a person of ordinary skill in the art and is not to be limited to a special or customized meaning, and refers without limitation to a path free of objects exceeding a threshold.

Figure 3:
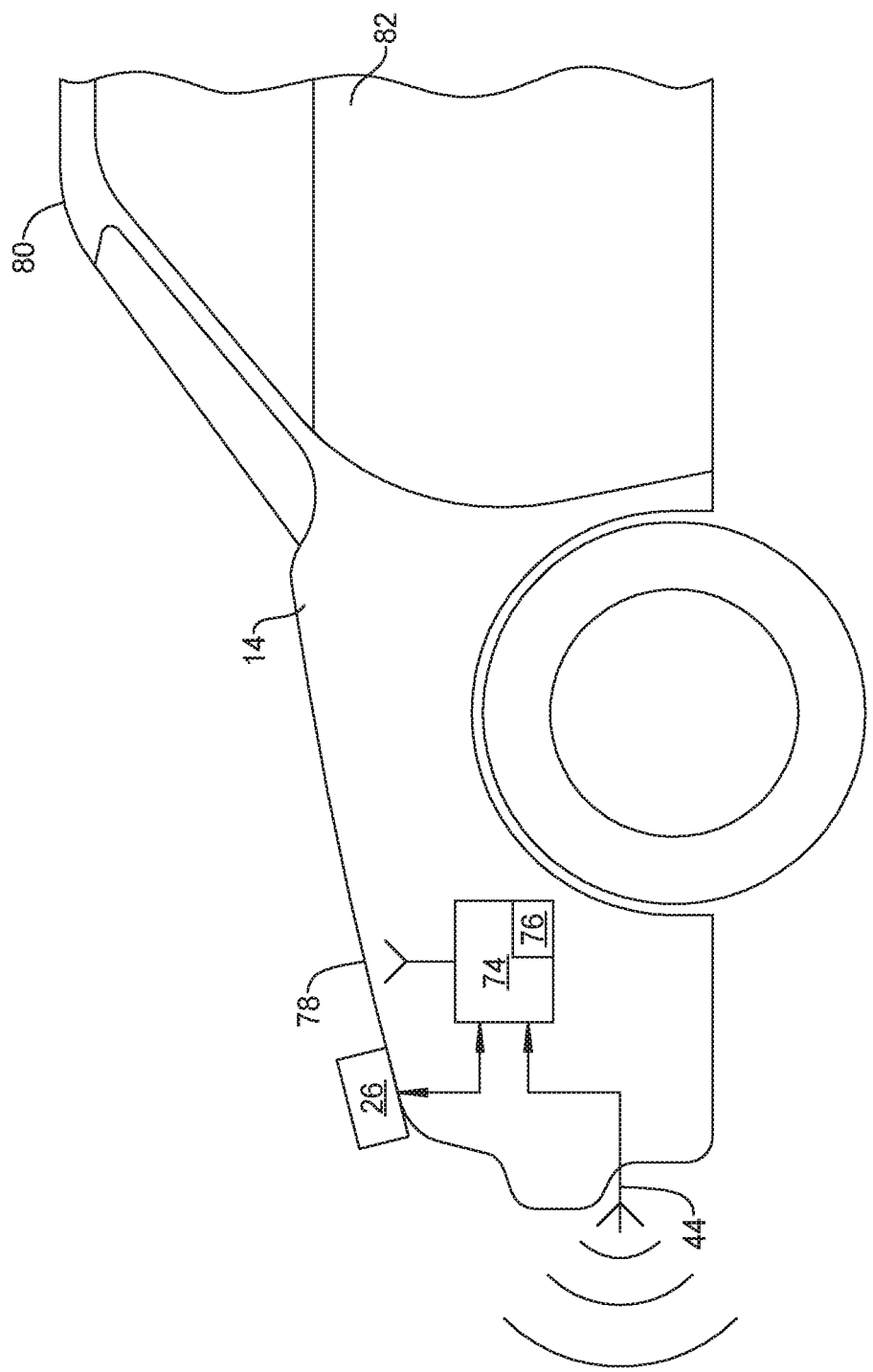
FIG. 3 is a left side elevational view of a portion of a vehicle having the HMI display adjustment system of FIG. 1.

The control module 74 is illustrated in FIG. 3, and as described herein defines a discrete element. Such illustration is for ease of description and it should be recognized that the control module 74 may take any suitable form including various combinations of one or more Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs, combinational logic circuit(s), input/output circuit(s) and devices, appropriate signal conditioning and buffer circuitry, and other suitable components to provide the described functionality.

The control module 74 has a set of control algorithms, including resident software program instructions and calibrations stored in a memory and executed to provide the desired functions. The algorithms are preferably executed during preset loop cycles. Algorithms are executed, such as by a central processing unit, and are operable to monitor inputs from the sensing devices and other networked control modules, and execute control and diagnostic routines to control operation at least of the HMI display 26. Loop cycles may be executed at regular intervals, or alternatively, algorithms may be executed in response to occurrence of an event such as when the customer 12 initiates an application on the personal communication device 36 to initiate operation of the HMI display adjustment system 10.

The control module 74 executes algorithmic code stored therein to monitor related equipment such as the vehicle object locating sensors 44 and execute commands or data transfers as indicated by analysis performed within the processing module. The control module 74 may also include algorithms and mechanisms to actuate autonomous driving control by means known in the art and not described herein, or the control module 74 may simply provide information to a separate autonomous driving system. The control module 74 is adapted to receive input signals from other systems and the customer 12 as necessary depending upon the exact embodiment utilized in conjunction with the control module 74.

The exemplary sensing system preferably includes object-locating sensors comprising at least two range sensing devices and accompanying subsystems or processors. The object-locating sensors may include the imaging system 76 as described herein above configured to include a short-range Lidar subsystem, a short-range or a long-range radar subsystem, and a forward vision system. The vehicle object-locating sensors 44 may include any range sensors, such as described herein above including FM-CW radars, (Frequency Modulated Continuous Wave), pulse and FSK (Frequency Shift Keying) radars, and LIDAR devices, and ultrasonic devices which rely upon effects such as Doppler-effect measurements to locate forward objects.

The vehicle object locating sensors 44 are preferably positioned on the vehicle 14 in relatively unobstructed positions. It is also appreciated that each of the sensors provides an estimate of actual location or condition of a targeted object such as the customer 12, wherein the estimate includes an estimated position and standard deviation. As such, sensory detection and measurement of object locations and conditions are typically referred to as "estimates." It is further appreciated that the characteristics of the vehicle object locating sensors 44 are complementary, in that some are more reliable in estimating certain parameters than others. Conventional sensors have different operating ranges and angular coverages, and are capable of estimating different parameters within their operating range. For example, radar sensors can usually estimate range, range rate and azimuth location of an object, but are not normally robust in estimating the extent of a detected object. A camera with vision processor is more robust in estimating a shape and azimuth position of the object, but is less efficient at estimating the range and range rate of the object. Scanning type LIDARs perform efficiently and accurately with respect to estimating range, and azimuth position, but typically cannot estimate range rate, and are therefore not accurate with respect to new object acquisition/recognition. Ultrasonic sensors are capable of estimating range but are generally incapable of estimating or computing range rate and azimuth position. Thus, conventional sensors present parametric variances whose operative overlap of these sensors creates opportunities for sensory fusion.

A HMI display adjustment system 10 and method of use of the present disclosure offers several advantages. These include the use of existing information including GPS data from the customer's mobile device, the use of low energy signals 42, and the use of signals from the vehicle object locating sensors 44 to obtain and refine knowledge about a customer's distance from the vehicle and determination of a precise customer location as the customer approaches a vehicle. The HMI display adjustment system 10 uses this information together with artificial intelligence to optimize a display brightness and messaging for an HMI display 26. Messaging presented by the HMI display 26 is also optimized and directed to specific sides of the vehicle based on the customer position.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A method for automatically adjusting a human machine interface (HMI) display of an automobile vehicle, comprising:
    collecting customer data of a customer;
    determining a distance between the customer and an automobile vehicle;
    changing an illumination level of an HMI display provided with the vehicle based on the distance between the customer and the vehicle;
    dividing the distance into multiple distance ranges, wherein the multiple distance ranges include:
        a first distance range including any distance greater than a predefined long-range distance threshold;
        a second distance range including any distance less than the predefined long range distance threshold but greater than a predefined short-range distance threshold; and
        a third distance range including any distance less than the predefined short-range distance threshold.

2. The method of claim 1, further including:
    setting the long-range distance threshold in a range between 15 and 50 meters; and setting the short-range distance threshold in a range between 1 and 15 meters.

3. The method of claim 1, further including the customer initiating an application on a customer personal communication device that communicates with the vehicle, and the vehicle approaches the customer within the first distance range, or the customer approaches the vehicle within the first distance range, or when the vehicle arrives at a specified customer pickup location communicated via the customer personal communication device.

4. The method of claim 1, further including:
setting the illumination level to a high brightness when the customer is at the first distance range at or beyond the predefined long-range distance threshold; and
setting the illumination level to a medium brightness less than the high brightness when the customer is at the second distance range less than the predefined long-range distance threshold but more than the short-range distance threshold.

5. The method of claim 1, further including setting the illumination level to a lowest brightness when the customer is at the third distance range less than the short-range distance threshold.

6. The method of claim 1, further including determining a customer location using global positioning system (GPS) location data from a personal communication device, wherein at the first distance range low energy signals from the personal communication device lack signal strength to assist in determining an exact location of the customer.

7. The method of claim 1, further including determining a customer location when the customer is within the second distance range using global positioning system (GPS) location data from a personal communication device and low energy signals from the personal communication device to generate a customer location prediction.

8. The method of claim 1, further including determining a customer location when the customer is within the third distance range using global positioning system (GPS) location data from a personal communication device, low energy signals from the personal communication device and signals received from at least one sensor mounted on the vehicle providing an exact location of the customer.

9. A method for automatically adjusting a human machine interface (HMI) display of an automobile vehicle, comprising:
collecting customer location data from a personal communication device of a customer and from sensor signals from at least one sensor mounted on an automobile vehicle as the customer approaches the vehicle;
applying the customer location data to determine if the customer is within one of a first distance range of the vehicle, a second distance range closer to the vehicle than the first distance range, or a third distance range closer than the second distance range; and
setting an illumination level of an HMI display provided with the vehicle based on which of the distance ranges is determined between the customer and the vehicle, wherein the illumination level is set to:
a high brightness if the customer is within the first distance range,
a medium brightness less than the high brightness if the customer is within the second distance range; or
a low brightness less than the medium brightness if the customer is within the third distance range.

10. The method of claim 9, further including presenting on the HMI display one of multiple different image sizes, one of multiple different image resolutions, one of different image colors and one of multiple different images based on which of the distance ranges is determined to optimize image visibility, aesthetics and legibility.

11. The method of claim 9, further including displaying messaging on the HMI display only to a side of the vehicle where the customer is approaching toward.

12. The method of claim 9, further including displaying messaging on the HMI display to:
provide a warning; or
direct the customer toward or away from one of multiple doors of the vehicle where the customer is approaching toward.

13. The method of claim 9, further including:
providing the customer location data as GPS location data and low energy data collected from the personal communication device;
adjusting the HMI display to present a data display on at least one of a right side, a left side, a vehicle front side and a vehicle rear side; and
adjusting a size, a color, or a text of an image presented on the HMI display.

14. The method of claim 9, wherein the at least one sensor defines a range detecting sensor including one of an ultrasonic sensor, a radar sensor and a Lidar sensor identifying a side of the vehicle the customer is approaching toward.

15. A method for automatically adjusting a human machine interface (HMI) display of an automobile vehicle, comprising:
in a data acquisition step:
identifying if GPS data from a personal communication device is available;
identifying if low energy signals from the personal communication device are available; and
identifying if sensor output signal data from vehicle sensors is available to generate a predicted customer location; and
in a decision step:
at a first collection point if the GPS location data is determined to be available but the low energy signals are not available and the sensor output signal data is not available, a customer location cannot be confirmed, and the customer is determined to be at a distance from the vehicle greater than a long-range distance threshold;
at a second collection point if the GPS location data is determined to be available and the low energy signals are available, but the sensor output signal data is not available the customer location is estimated, and the customer is determined to be at a distance from the vehicle less than the long-range distance threshold but more than a short-range distance threshold; or
at a third collection point if the GPS location data is determined to be available, the low energy signals are available, and the sensor output signal data is available the customer location is confirmed, and the customer is determined to be at a distance from the vehicle less than the short-range distance threshold.

16. The method of claim 15, wherein when the customer is determined to be at the distance from the vehicle greater than the long-range threshold a lighting system of an HMI display having each of a high illumination, a medium illumination less than the high illumination and a low illumination less than the medium illumination is set to the high illumination defining a high brightness with image parameters set for an optimal long-range visibility.

17. The method of claim 15, wherein when the customer is determined to be at the distance from the vehicle less than the long-range threshold but more than a short-range distance threshold a lighting system of an HMI display having each of a high illumination, a medium illumination less than the high illumination and a low illumination less than the medium illumination is set to the medium illumination defining a medium brightness with image parameters set for an optimal medium range visibility.

18. The method of claim 15, wherein when the customer is determined to be at the distance from the vehicle less than the short-range threshold a lighting system of an HMI display having each of a high illumination, a medium illumination less than the high illumination and a low illumination less than the medium illumination is set to the low illumination defining a low brightness with image parameters set for a short-range visibility.

* * * * *